United States Patent Office 3,309,946
Patented Mar. 21, 1967

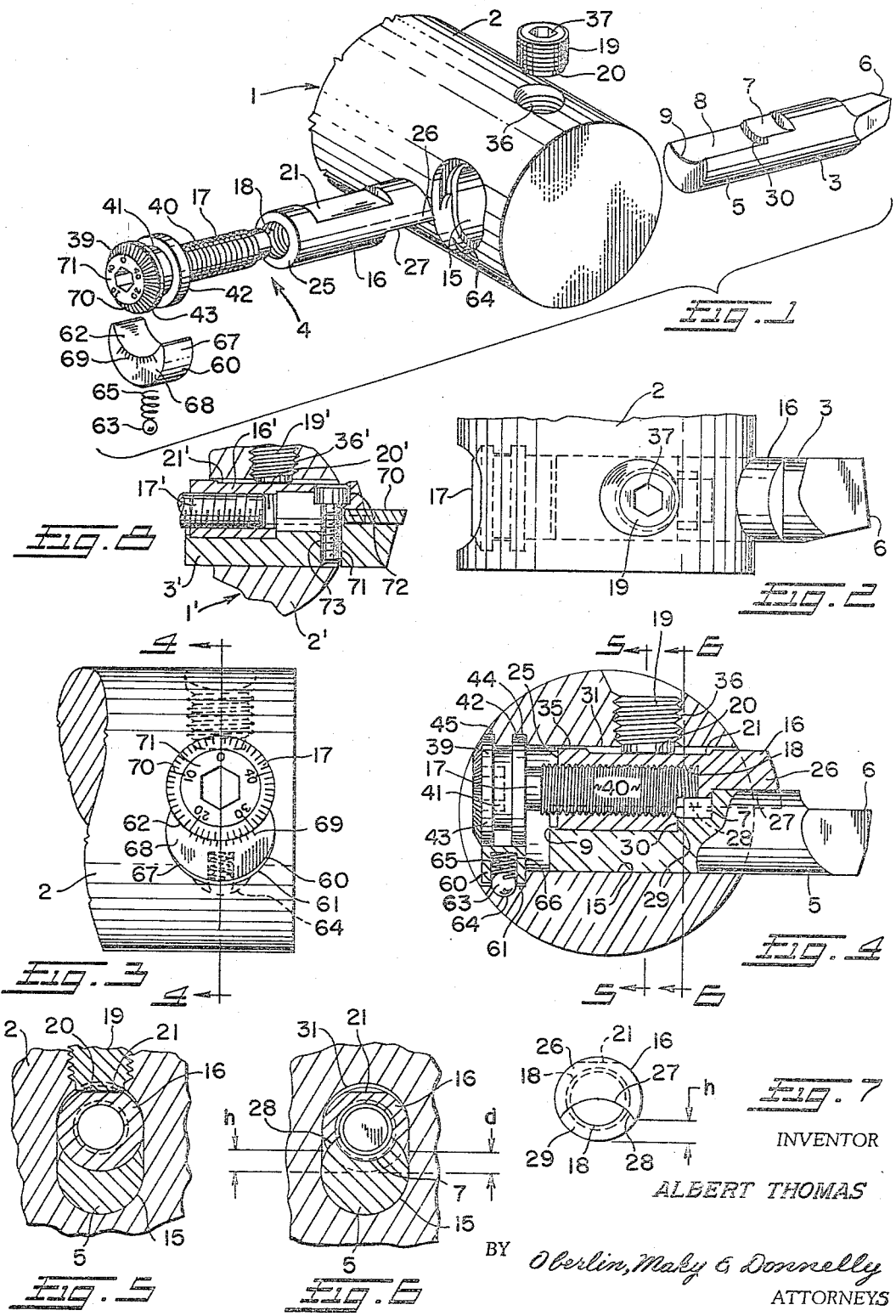

3,309,946
BORING TOOL
Albert Thomas, 114 E. James St., Munhall, Pa. 15120
Filed Aug. 18, 1965, Ser. No. 480,593
19 Claims. (Cl. 77—58)

The present invention relates generally, as indicated, to a boring tool and, more particularly, to a boring tool which is simple in construction and relatively inexpensive to manufacture, and yet can be quickly and easily adjusted to cut a wide range of bore diameters with a very high degree of accuracy.

Oftentimes it is necessary to perform cutting operations with a great deal of precision and uniformity. While cutting tools are presently available for making cuts of almost any preciseness desired, such tools generally consist of a great many parts, most of which are quite expensive to manufacture.

It is therefore a principal object of this invention to provide a novel, relatively simple and inexpensive boring tool or the like which may be accurately adjusted to perform very precise cutting operations.

Another object is to provide such a boring tool with a cutting element and a manually operable cutter adjusting means having mating and interlocking surfaces.

Still another object is to provide such a boring tool with a set screw for forcing such adjusting means into tight frictional contact with such cutting element, whereby precise movements of the adjusting means will cause the same precise movements of the cutting element.

Yet another object is to provide such a boring tool with a set screw as described which remains stationary during axial movement of the adjustment means and cutting element.

A further object is to provide a tool of the type described which is quite compact as compared to prior art cutting tools, with all of the parts except for the cutting end of the cutter being contained within the body of the tool.

Another object is to provide such a boring tool in which all of the operating parts are permanent, except for the cutting element, which may be quickly and easily replaced whenever necessary without disturbing the other parts.

A further object is to provide such a tool in which all of the operating parts may be quickly assembled and disassembled in the tool body when desired, as for cleaning and oiling, for example.

Still another object is to provide such a tool with a removable vernier scale for measuring the amount of axial adjustment of the cutter.

Another object is to provide such a tool with a cutter which may be accurately retracted any predetermined amount as well as advanced.

Still another object is to provide such a boring tool with an adjusting nut which is adapted to be held in tight frictional contact with the cutting tool, and an adjusting screw which is adapted to float in the tool body to a position always in direct axial alignment with the bore in the nut in which the screw is threadedly received, whereby the screw will not bind in the nut.

Another object is to provide a boring tool with an adjusting screw the axis of which is in a common plane with the axis of the cutting edge of the cutter, whereby a direct thrust is applied by the adjusting screw to the cutter relative to the cutting edge.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is an exploded perspective view showing a preferred form of boring tool in accordance with the present invention with the parts thereof in disassembled form;

FIG. 2 is a top plan view of such boring tool, but with the parts assembled;

FIG. 3 is a side elevation view of such boring tool as viewed from the left side of FIG. 1, but also with the parts assembled;

FIG. 4 is a vertical section taken on the plane of the line 4—4 of FIG. 3;

FIG. 5 is a fragmentary vertical section taken on the plane of the line 5—5 of FIG. 4;

FIG. 6 is a fragmentary vertical section taken on the plane of the line 6—6 of FIG. 4;

FIGURE 7 is an end elevation of the adjusting nut as viewed from the right-hand side of FIGS. 1 and 4; and FIG. 8 is a fragmentary cross-section view similar to FIG. 4 except illustrating a modification.

Referring now more particularly to the drawing, and first of all to FIG. 1, the preferred form of boring tool of this invention is generally indicated at 1 and comprises a body member 2 having a plurality of transverse openings in one end thereof for receipt of a cutting element 3 and cutter adjusting mechanism 4. The body member 2 is preferably in the shape of a bar which is adapted to be secured to the spindle or static support of a machine tool or the like, not shown. While the cutting element 3 is shown extending radially outwardly from the bar body 2, it should be understood that it could be disposed at any angle with respect to the axis of the body, or parallel to the axis, for that matter.

As clearly illustrated in FIGS. 1 and 4, the cutting element 3 comprises a cylindrical shank portion 5 having a cutting edge 6 on one end which may be of solid high speed steel formed integral with the shank portion 5, or the shank may be carbide or cast alloy tipped, as well known in the art. A portion of the shank 5 in axial alignment with the cutting edge 6 is cut away as by a simple milling operation to provide a pair of concave stepped surfaces 7 and 8 and a shallow, concave ridge 9 projecting upwardly from the end of the surface 8 remote from the surface 7. The cutting element 3 is adapted to be slidably received in a transverse bore 15 extending all the way through the bar body 2 with its center line preferably being located below the center of the bar body 2 by a distance approximately equal to one half the radius of the cutter shank 5.

For axially adjustably holding the cutting element 3 within the bore 15 in the bar body 2, there is provided the adjusting mechanism 4, which comprises an adjusting nut 16, an adjusting screw 17 threadably received in an axial bore 18 in the adjusting nut 16, and a set screw 19 having a flat lower end 20 which is adapted to engage the flat face 21 of the adjusting nut 16, said set screw 19, when tightened, forcing the adjusting nut 16 into tight frictional engagement with the cutting tool 3, as will be more fully explained hereafter.

The adjusting nut 16, like the shank portion 5 of the cutting tool 3, is cylindrical and desirably is of a diameter approximately equal to the diameter of the shank 5. One end 25 of the adjusting nut 16 is flat in a plane perpendicular to its axis, while the other end 26 has a slot 27 milled therein having a depth $h$ at the outer periphery of the nut 16 (see FIGS. 6 and 7) equal to the depth $d$ of the concave surface 8. Also, the slot 27 extends through the wall portion 28 of the bore 18 in the nut 16 on a radius equal to the radius of the cutter shank 5, and the length of the adjusting nut 16 between the end 25 and the inner end 29 of the slot 27 is approximately equal or just slightly less than the distance between the shoulder 30 and ridge 9 on the cutter shank 5. Moreover, the radius of the concave surface 8 on the cutting element 3 is equal to the radius of the nut 16. Accordingly, when the nut 16 is disposed on the surface 8 with the concave wall portion 28 of the slot 27 extending beyond the shoulder 30, the nut 16 and cutting element 3 are interlocked, since the wall portion 28 engages the outer surface of the shank 5 to prevent relative rotation between the two parts, and the shoulder 30 and ridge 9 on the cutting element 3 prevent relative axial movement between such parts.

For receipt of the nut 16 in the bar body 2, there is provided a second transverse bore 31 the center line of which is parallel to the center line of the bore 15 and located above the center of the bar body 2 preferably by a distance slightly greater than one half the radius of the cutting element 3. Accordingly, with the nut 16 disposed in the bore 31 and engaging the cutting element 3 as aforesaid, there is a clearance 35 between the bore 31 and the top of the nut 16 which, if bore 31 did not extend through body 2, would be slightly greater than the height of the ridge 9 on the cutting element 3 to permit assembly and disassembly of the nut 16 and cutting element within the bar body 2. However, as shown, element 3 and nut 16 may be inserted and withdrawn together from the right-hand side of FIG. 4.

In addition to the mechanical interlock between the adjusting nut 16 and cutting element 3, the nut 16 is urged into tight frictional contact with the cutting element upon tightening of the set screw 19 in the tapped hole 36 as by means of a wrench inserted in the hex socket 37 in the set screw 19.

Axial movement of the adjusting nut 16 is effected by turning the adjusting screw 17, it having a head portion 39 and a shank 40 preferably with left-hand threads which engage similar left hand threads in the bore 18 of the adjusting nut 16. The head portion 39 of the adjusting screw 17 has a groove 41 formed intermediate the ends thereof to define a pair of ribs 42 and 43 respectively received in a groove 44 formed in the wall of the bore 31 and a counterbore 45. It should be noted, however, that the ribs 42 and 43 do not tightly engage the radial outer walls of the groove 44 and counterbore 45, respectively, when the adjusting screw 17 is threaded into the bore 18 of the nut 16 and they are positioned in the bar body 2 as in FIG. 4. Rather, there is a slight clearance therebetween, thereby permitting the adjusting screw 17 to float somewhat so that its axis will always be in exact axial alignment with the axis of the nut 16. This is an important feature, since if their axes are even slightly out of alignment, the adjusting screw 17 will have a tendency to bind in the nut bore 18, and thus be more difficult to turn. Also, any misalignment of the adjusting screw 17 will result in inaccuracies of adjustment.

As should now be apparent, when the cutting element 3, nut 16, and adjusting screw 17 are assembled within the bar body 2, rotation of the screw 17, as by means of a wrench inserted in the hex socket in the outer end thereof, will cause the nut 16 and thus the cutting element 3 to move in an axial direction either inwardly or outwardly, depending upon the direction in which the adjusting screw 17 is rotated. Because the axis of the adjusting screw 17 and the axis of the cutting edge 6 are in alignment in a common plane, a direct thrust load is applied by the adjusting screw 17 to the cutting element centrally of its cutting edge, which is quite desirable and makes for more accurate adjustment than would otherwise be possible.

Referring further to FIG. 4, movement of the nut 16 toward the left to retract the cutting element 3 is limited by contact between the end of the cutting element 3 and the adjacent face of the screw head 39, the concave surface 7 on the cutter shank 5 providing a clearance space for receipt of the projecting end of the adjusting screw 17 when the cutting element 3 is so retracted. On the other hand, the shoulder at the left end of the flat 21 engaging the side of set screw 19 limits adjustment of the cutting element 3 toward the right.

For accurately determining the amount of axial adjustment effected through rotation of the adjusting screw 17, a crescent-shaped vernier member 60 is disposed in a counterbore 61 in the bore 15 with the inner concave surface 62 having a radius equal to the radius of the ribs 42 and 43 on the adjusting screw 17 for uniform sliding contact therewith. The vernier member 60 is retained in the counterbore 61 by means of a ball detent 63 yieldably urged into a groove 64 in the wall of the counterbore 61 by a small compression spring 65 disposed in a recess 66 in the outer convex surface 67 of the vernier member 60. Preferably, the ball detent 63 is staked in the recess 66 to preclude it from dropping completely out when the vernier member 60 is removed from the counterbore 61.

The outer end face 68 of the vernier member 60 has graduations 69 thereon which are adapted to be aligned with graduations 70 on the outer end face 71 of the adjusting screw 17 for measuring the amount of axial movement effected for a given amount of rotation of the adjusting screw. While the number of threads per inch on the adjusting screw 17 and the spacing of the graduations 70 on the adjusting screw may obviously be varied as desired, in the preferred form shown there are forty threads per inch and fifty equally spaced graduations on the adjusting screw, whereby each graduation represents .0005 inch adjustment axially or .001 inch bore diameter adjustment.

As previously indicated, the radius of the inner concave surface 62 is equal to the radius of the ribs 42 and 43 on the adjusting screw 17 against which the vernier member 60 is held by the light spring pressure of the compression spring 65. This is necessary if the spacing of the vernier scale with respect to the scale on the head portion 39 of the adjusting screw 17 is to be very accurate. Also, the force exerted by the spring 65 on the vernier member 60 is just sufficient to hold the vernier member against the adjusting screw as aforesaid, and will not interfere with the floating of the screw head 39 in the bore 31.

To assemble the various operating parts of the boring tool 1, first the adjusting screw 17 is inserted into position in the bore 31, making sure that the ribs 42 and 43 on the head portion 39 are located in the groove 44 and counterbore 45, respectively. Next, the vernier member 60 is pressed into place with the ball detent 63 being disposed in the groove 64. Since the compression spring 65 urges the vernier member 60 into engagement with the adjusting screw 17, the parts thus far assembled will not fall out of the bar body 2 without first pulling the vernier member 60 out. This can easily be done, however, since the pressure exerted by the spring 65 is light, just sufficient to hold the various parts in the assembled position so that the bar can be handled.

Now the cutting element 3 and adjusting nut 16 in interlocking engagement therewith are inserted into the bores 15 and 31, respectively, as a single unit until the bore 18 in the adjusting nut is brought into contact with the shank 40, after which the adjusting screw 17 is rotated in the proper direction to draw the adjusting nut and cutting element the rest of the way into the bar body 2. Finally, the set screw 19 is inserted into the tapped hole 36 and tightened to force its lower end 20 into engagement with the flat 21 on the adjusting nut 16 and thus force the nut 16 and cutting tool 3 into tight frictional engagement against the wall of the bore 15. When so assembled, the adjusting nut 16 and cutting element 3 are interlocked against both rotary and axial movement with respect to each other. Also, movement or play of the cutting element 3 in the bore 15 is precluded because of its snug sliding fit therein. The same is true of the nut 16, at least to the extent that it engages the wall of its bore 31.

With the parts so assembled, the cutting element 3 can be retracted or advanced simply by rotating the adjusting screw 17. Even though the set screw 19 does not move with the adjusting nut 16 and cutting element 3, when the set screw 19 is sufficiently tightened, it will hold the nut 16 and cutting element 3 in tight frictional contact against the wall of the bore 15 and still permit the nut and cutting element to slide axially therein as aforesaid.

When it is desired to disassemble the boring tool 1, as for cleaning, oiling, or replacing a part, the same steps for assembly are followed, but in the reverse order. Thus, first the set screw 19 is withdrawn and the adjusting screw 17 is rotated until the nut 16 is freed, after which the cutting tool 3, adjusting nut 16, vernier member 60, and adjusting screw 17 may be removed.

Referring now to FIG. 8, there is shown a somewhat modified form of boring tool in which the cutting tip 70 for the cutting element 3 is a separate part and is adapted to be clamped between the adjusting nut 16′ and cutting element 3′ as by means of a clamping screw 71 extending through an opening 72 in the nut 16′ and threadably engaging a tapped bore 73 in the cutting element 3′. Otherwise the boring tool 1′ illustrated in FIG. 8 is identical to the boring tool 1 previously described. Accordingly, the same reference numerals followed by a prime symbol are used to designate like parts.

Extensive tests using a boring tool 1 or 1′ as described above were conducted as follows. Fifty bores were made with the boring tool. In making the first bore, the adjusting screw 17 was advanced .0020 inch and the completed bore measured 4.2999 inches in diameter. Then the remaining forty-nine bores were made, each time advancing the adjusting screw 17 .0020 inch to cut the next bore .0040 inch in diameter larger than the last. After completion of each bore, its diameter was accurately measured to determine the error, if any, which resulted from using the adjusting mechanism 4 on the boring tool 1. The results were divided into ten groups, and the greatest variation or error for each group was determined as follows:

| Group: | Greatest variation or error for the group, inches |
|---|---|
| 1 | .0001 |
| 2 | .00005 |
| 3 | .00005 |
| 4 | .00005 |
| 5 | .00005 |
| 6 | .00005 |
| 7 | .0001 |
| 8 | .00000 |
| 9 | .00000 |
| 10 | .00005 |

As evident from the above, the accuracy achieved with this boring tool was quite high. In addition, indicator readings were repeatedly taken with the boring tool 1 over a range of .025 inch, and the accuracy was always within .00005 inch. Also, the cutter 3 was repeatedly retracted further than it had been advanced, and then advanced to the original starting position on the dial, and it was found that the reading of the indicator was almost always identical with the previous reading.

From the above, it is now evident that unusual accuracy of adjustment can be obtained consistently and with certainty using a boring tool 1 constructed in accordance with the present invention, even though the boring tool is relatively simple in construction, can be manufactured economically, and has a vernier type scale for determining the amount of axial adjustment.

Other modes of applying the principles of the invention may be employed, change being made as regards the details described, provided the features stated in any of the following claims or the equivalent of such be employed.

I, therefore, particularly point out and distinctly claim as my invention:

1. A boring tool comprising a body member having a bore therein for receipt of a cutting element, an adjusting means mounted in said body member for movement in a direction parallel to the axis of said cutting element and in contact with a portion of said cutting element, and means for urging said adjusting means toward said cutting element and thus said cutting element against the wall of said bore to establish tight frictional contact between said adjusting means and said cutting element, whereby movement of said adjusting means in opposite directions will cause axial movement of said cutting element into and out of said body member.

2. The tool of claim 1 further comprising means for effecting a mechanical interlock between said adjusting means and cutting element.

3. The tool of claim 1 wherein said adjusting means comprises an adjusting nut slidably received in a second bore in said body member which is parallel to said first-mentioned bore and intersects the same, an adjusting screw threadably engaging said adjusting nut, and means mounting said adjusting screw in said body member for rotational movement therein, whereby rotation of said adjusting screw causes movement of said nut and thus said cutting element as aforesaid.

4. The tool of claim 3 wherein there is a clearance space between said adjusting nut and a portion of the wall of said second bore to permit assembly and disassembly of said nut and cutting element from within said body member.

5. The tool of claim 3 wherein said means for mounting said adjusting screw in said body member for rotation as aforesaid comprises a rib on one end of said screw and a groove in said second bore into which said rib is adapted to extend.

6. The tool of claim 5 wherein there is a slight clearance between the outer radial surface of said rib and the adjacent surface of said groove to permit radial floating of said adjusting screw to a position always in exact axial alignment with the axis of said nut.

7. The tool of claim 3 wherein the axis of said adjusting screw and the cutting edge of said cutting element are inalignment in a common plane, whereby a direct thrust is applied by said adjusting screw to said cutting element centrally of said cutting edge upon rotation of said adjusting screw.

8. The tool of claim 1 wherein said means for urging said adjusting means toward said cutting element comprises a set screw threadably received in another bore in said body member extending into said second bore.

9. The tool of claim 8 wherein there is a flat surface on said adjusting nut which is engaged by the inner end of said adjusting screw.

10. The tool of claim 3 further comprising a cutting tip, and screw means for releasably clamping said cutting tip between said adjusting nut and said cutting element.

11. The tool of claim 3 further comprising a vernier member, means for removably retaining said vernier member within said body member, said adjusting screw having a cylindrical surface with graduations on one end face thereof for alignment with a vernier scale on said vernier member, said vernier member having a concave surface with a radius equal to the radius of said cylindrical surface, and spring means for urging said concave surface of said vernier member into uniform sliding contact with said cylindrical surface to locate accurately said vernier scale with respect to said graduations on said adjusting screw.

12. A boring tool comprising a rod-like body member, a first transverse bore in said body member, a cutting element having a cylindrical shank portion closely slidably received in said first bore, said first transverse bore extending through said bar body with its center line being located below the center of said bar body by a distance approximately equal to one half the radius of said shank portion, a second transverse bore extending through said bar body parallel to said first bore and located above the center of said bar body by a distance slightly greater than one half the radius of said shank portion, a cylindrical adjusting nut slidably received in said second bore, means for effecting a positive mechanical interlock between said adjusting nut and said shank portion, and means for effecting axial movement of said nut and thus said shank portion within said bar body.

13. The tool of claim 12 wherein said means for effecting a mechanical interlock between said nut and shank portion comprises a pair of concave stepped surfaces on said shank portion defining a shoulder therebetween, a slot formed in one end of said nut and having a depth at its outer periphery equal to the depth of the deepest of said concave surfaces, said slot extending through the wall of said nut on a radius equal to the radius of said shank portion, said nut being disposed on said deepest concave surface with the wall of said slot extending beyond said shoulder and in contact with said shank to prevent relative rotation between said nut and shank portion and relative axial movement therebetween in one direction.

14. The tool of claim 12 wherein said means for effecting axial movement of said nut and thus said shank portion within said bar body comprises an adjusting screw threadably engaging said adjusting nut, and means mounting said adjusting screw in said body member for rotational movement therein, whereby rotation of said adjusting screw causes movement of said nut and thus said cutting element as aforesaid, said last-mentioned means comprising a head portion on said adjusting screw having a pair of cylindrical ribs with a groove therebetween, a groove and counterbore in said second bore into which said ribs extend, there being a radial clearance between said ribs on said adjusting nut and the walls of said groove and counterbore in said second bore to permit radial floating of said adjusting screw to a position always in exact axial alignment with the axis of said nut, the axes of said adjusting screw and the cutting edge of said cutting element being in alignment in a common plane, whereby a direct thrust is applied by said adjusting screw to said cutting element centrally of its cutting edge upon rotation of said adjusting screw.

15. In a tool for removing metal or the like, a body member having a first opening therein, a cutting element having a shank portion closely slidably received in said opening, an adjusting nut in said body member in contact with said shank portion, means on said shank portion and adjusting nut for establishing a mechanical interlock therebetween including a pair of concave, stepped surfaces on said shank portion defining a shoulder therebetween, a slot formed in one end of said adjusting nut and having a depth at its outer periphery equal to the depth of the deepest of said concave surfaces, said slot extending through the wall of said nut on a radius equal to the radius of said shank portion, said nut being otherwise cylindrical with a radius equal to the radius of said deepest concave surface, said nut being disposed on said deepest concave surface with the wall of said slot extending beyond said shoulder and in contact with said shank to prevent relative rotation between said nut and shank and relative axial movement therebetween in one direction, and means for adjusting the position of said adjusting nut in said body member to cause a corresponding adjustment in the position of said cutting element.

16. The tool of claim 15 wherein there is a ridge projecting from said deepest concave surface spaced from said shoulder by a distance equal to the length of said nut to said slot, said ridge preventing relative axial movement between said nut and shank in the opposite direction when said nut is disposed between said ridge and shoulder on said deepest concave surface.

17. The tool of claim 3 further comprising a vernier member, and means for removably retaining said vernier member within said body member comprising a detent disposed in a recess in said vernier member and urged into a groove in said body member by a spring means pressing against said detent, said adjusting screw having a cylindrical surface with graduations on one end face thereof for alignment with a vernier scale on said vernier member, said vernier member having a concave surface with a radius equal to the radius of said cylindrical surface, said spring means urging said concave surface of said vernier member into uniform sliding contact with said cylindrical surface to locate accurately said vernier scale with respect to said graduations on said adjusting screw.

18. The tool of claim 14 further comprising a vernier member, and means for removably retaining said vernier member within said body member comprising a detent disposed in a recess in said vernier member and urged into a groove in a counterbore in said first bore in said body member by a spring means pressing against said detent, the outer rib on said adjusting screw having graduations on the outer end face thereof for alignment with a vernier scale on said vernier member, said vernier member having a concave surface with a radius equal to the radius of said ribs on said adjusting screw, said spring means urging said concave surface of said vernier member into uniform sliding contact with said ribs to locate accurately said vernier scale with respect to said graduations on said adjusting screw.

19. In a tool for removing metal and the like, a body member having an opening therein, a cutting element having a shank portion closely slidably received in said opening, an adjusting nut disposed in said body member in contact with said shank portion, means on said shank portion and adjusting nut for establishing a mechanical interlock therebetween, an adjusting screw threadably received in a bore in said adjusting nut, means mounting said adjusting screw against movement in an axial direction, whereby rotation of said adjusting screw causes axial movement of said nut and thus said cutting element within said body member, and means supporting said adjusting screw for radial floating movement to a position always in axial alignment with said bore in said adjusting nut.

References Cited by the Examiner
UNITED STATES PATENTS
22,359,957  10/1944  Zempel.

WILLIAM W. DYER, Jr., *Primary Examiner.*
G. A. DOST, *Examiner.*